(12) United States Patent
Baudot et al.

(10) Patent No.: US 11,480,745 B2
(45) Date of Patent: Oct. 25, 2022

(54) COMPANION AND HOST CHIP PHOTONIC INTEGRATION

(71) Applicant: Ciena Corporation, Hanover, MD (US)

(72) Inventors: Charles Baudot, Quebec (CA); Simon Savard, Quebec (CA); François Pelletier, Quebec (CA); Claude Gamache, Gatineau (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/122,491

(22) Filed: Dec. 15, 2020

(65) Prior Publication Data

US 2022/0187550 A1    Jun. 16, 2022

(51) Int. Cl.
*G02B 6/42* (2006.01)

(52) U.S. Cl.
CPC .................. *G02B 6/4239* (2013.01)

(58) Field of Classification Search
CPC .................. G02B 6/42; G02B 6/423
See application file for complete search history.

(56) References Cited

U.S. PATENT DOCUMENTS

| | | | | |
|---|---|---|---|---|
| RE44,664 E | * | 12/2013 | McColloch | G02B 6/4214 385/115 |
| 10,852,492 B1 | * | 12/2020 | Vermeulen | G02B 6/423 |
| 2017/0017034 A1 | | 1/2017 | Painchaud et al. | |
| 2018/0052290 A1 | * | 2/2018 | Kinghorn | H01L 25/50 |
| 2019/0243081 A1 | | 8/2019 | Watts et al. | |
| 2020/0144151 A1 | * | 5/2020 | Bettman | G02B 6/4269 |
| 2020/0158959 A1 | * | 5/2020 | Ardalan | G02B 6/43 |
| 2020/0292766 A1 | * | 9/2020 | Vermeulen | G02B 6/4214 |

FOREIGN PATENT DOCUMENTS

CN    101184608 B  *  2/2011  .........  B29C 45/0025

OTHER PUBLICATIONS

E. Marchena et al. "Integrated Tunable CMOS Laser for Si Photonics" Skorpios Technologies, Inc., Albuquerque NM, USA, Optical Society of America, 978-1-55752-963-3/13 (2013).
G. Li et al. "100Gb/s CWDM Transmitter and Receiver Chips on a Monolithic Si-Photonics Platform" Skorpios Technologies, Inc., Albuquerque NM, USA, IEEE, 978-1-5090-1903-8/16 (2016).

* cited by examiner

*Primary Examiner* — Eric Wong
(74) *Attorney, Agent, or Firm* — Young Basile Hanlon & MacFarlane, P.C.

(57) ABSTRACT

At least a portion of an integrated circuit wafer includes at least one layer in which two or more waveguides are formed. A cavity is formed in the integrated circuit wafer. At least one die, comprising a photonic integrated circuit, has: at least one edge on which there are two or more optical mode defining structures in proximity to respective optical mode defining structures on at least one surface of the cavity, a bottom surface secured to a bottom surface of the cavity, and a top surface on which there is at least one metal contact.

20 Claims, 17 Drawing Sheets

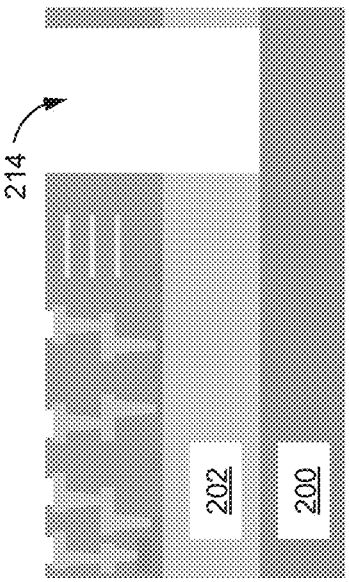
FIG. 3A
FIG. 3B
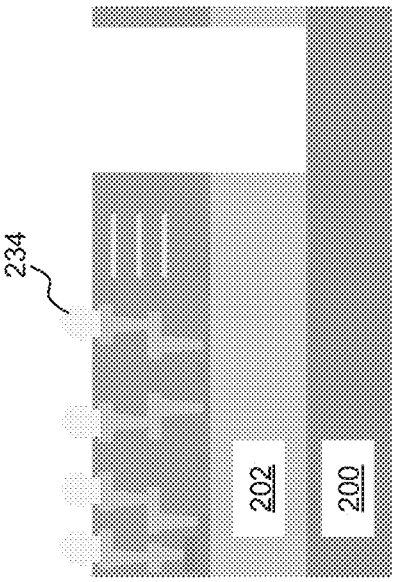
FIG. 3C
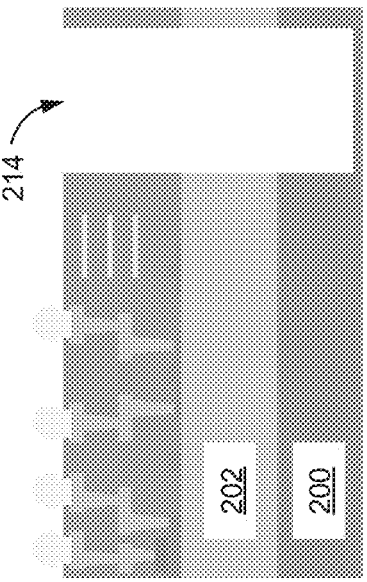
FIG. 3D

COMPANION AND HOST CHIP PHOTONIC INTEGRATION

TECHNICAL FIELD

This disclosure relates to companion and host chip photonic integration.

BACKGROUND

Various techniques are used for integrating different types of chips into a common package (e.g., a system-in-package technique). For example, a chip using III-V semiconductor material (or simply "III-V material") manufacturing platform (e.g., for materials composed from elements in groups III and V in the periodic table, such as GaAs and InP) can be integrated with a chip fabricated using silicon photonics (SiPhot) manufacturing platform based on silicon wafers, including silicon-on-insulator (SOI) wafers (e.g., techniques similar to those used for CMOS manufacturing). For example, a III-V laser chip can be integrated with a SiPhot chip that includes a photonic integrated circuit (PIC) with various functional elements (e.g., waveguides, modulators, and photodetectors) to provide light to those functional elements. Due to the relatively large lattice mismatch between silicon and III-V materials, and other challenges associated with integrating different platforms, there are potential difficulties and drawbacks for some integration techniques, as described in more detail below.

SUMMARY

In one aspect, in general, an article of manufacture comprises: at least a portion of an integrated circuit wafer that includes at least one layer in which two or more waveguides are formed; a cavity formed in the integrated circuit wafer; at least one die comprising a photonic integrated circuit. The die has: at least one edge on which there are two or more optical mode defining structures in proximity to respective optical mode defining structures on at least one surface of the cavity, a bottom surface secured to a bottom surface of the cavity, and a top surface on which there is at least one metal contact.

Aspects can include one or more of the following features.

A plurality of the two or more optical mode defining structures are aligned to the respective optical mode defining structures on at least one surface of the cavity.

The respective optical mode defining structures on at least one surface of the cavity comprise ends of respective waveguide couplers that are coupled to waveguides in the layer of the integrated circuit.

The bottom surface of the die is secured to the bottom surface of the cavity by at least one of: a cured adhesive, a metal or metal alloy, or a flowable oxide.

A top surface of the die is substantially aligned with a top surface of the photonic integrated circuit.

The two or more optical mode defining structures are ends of a single curved waveguide in the die.

The metal contact on the top surface of the die is electrically connected to a portion of the integrated circuit wafer.

The integrated circuit wafer comprises at least one layer of silicon.

The cavity is shaped to include inset portions in at least two corners to provide closer proximity to the surface of the cavity for a middle portion of the edge of the die than for either of two end portions of the edge of the die.

The bottom surface of the cavity includes at least one trench.

The die includes at least one reflector coupled to at least one of the optical mode defining structures on the edge of the die.

In another aspect, in general, a method comprises: forming two or more waveguides in at least one layer of an integrated circuit wafer; forming a cavity in the integrated circuit wafer; and securing a die comprising a photonic integrated circuit within the cavity. The securing comprises: aligning two or more optical mode defining structures on at least one edge of the die to respective optical mode defining structures on at least one surface of the cavity, and forming a bond between a bottom surface of the die and a bottom surface of the cavity. The method further comprises forming an electrical connection between at least one metal contact on a top surface of the die to a portion of the integrated circuit wafer.

Aspects can include one or more of the following features.

The method further comprises dicing the integrated circuit wafer to form a host die that includes the cavity and the die secured within the cavity.

The respective optical mode defining structures on at least one surface of the cavity comprise ends of respective waveguide couplers that are coupled to waveguides in the layer of the integrated circuit.

The bond secures the bottom surface of the die to the bottom surface of the cavity by at least one of: a cured adhesive, a metal or metal alloy, or a flowable oxide.

A top surface of the die is substantially aligned with a top surface of the photonic integrated circuit.

The two or more optical mode defining structures are ends of a single curved waveguide in the die.

The cavity is shaped to include inset portions in at least two corners to provide closer proximity to the surface of the cavity for a middle portion of the edge of the die than for either of two end portions of the edge of the die.

The method further comprises forming at least one trench in the bottom surface of the cavity.

The die includes at least one reflector coupled to at least one of the optical mode defining structures on the edge of the die.

Aspects can have one or more of the following advantages.

The techniques described herein enable optimized manufacturing techniques for a companion die based on one platform and potentially different optimized manufacturing techniques for a host die based on another platform. For example, a companion die is able to be processed in a dedicated foundry using optimized fabrication methods and materials. One or more companion die(s) can then be integrated at the wafer stage into a host wafer before the wafer is diced into separate dies (or dice) using the techniques described herein. This facilitates independent optimized fabrication for the host die, including fabrication steps that can be performed before and/or after integration of the companion die or dies. There may not be a single material that encompasses all required characteristics of a photonic integrated circuit since the various optical structures and electro-optical structures that may appear in a photonic integrated circuit may rely on different materials. Using the techniques described herein, no single foundry needs to be capable of using all the materials and processing technologies for both the host die and companion die. There are also no material cross-contamination issues between the foundries, and no need to introduce new materials in a foundry or to reserve a dedicated zone of the foundry to "forbidden" materials (e.g., materials that are not typically used in standard fabrication processes, such as CMOS-forbidden materials that are not typically used in silicon-based CMOS fabrication facility). The cost-of-production, yield, and reliability characteristics of each platform (of the host and companion dies, respectively) can be achieved without compromise.

A variety of advantages of the various implementations of the integration techniques described herein are achieved during fabrication of an integrated device or during subsequent operation of the integrated device, including the following.

Alignment of an optical connection between optical interfaces of the companion die and the host wafer or die is separated from electrical connection between electrical interfaces of the companion die and the host wafer or die. Thus, the optical alignment can be performed and optimized first followed by independent electrical connection, which enables the optical alignment tolerance requirements to be decoupled from the electrical connection tolerance requirements. A relatively low insertion loss between the fabricated host die and the companion die during device operation can be achieved as a result of the optimized independent optical alignment. An optical interface can include a portion of a waveguide that is routed all the way to an edge facet, for example, with an end of the waveguide comprising a tip of a core structure or tapered coupling structure that ends at the edge facet. An electrical interface can be formed using conducting contacts that are adjacent to conducting connective structures of various shapes (e.g., wire bonds, pillars, vias, or bumps) comprising metal or metal alloys.

In some implementations, a curved waveguide routing (e.g., C-shaped or U-shaped routing) is able to confine the optical mode defining structures of the optical interfaces to a single edge of the companion die, thus removing the potentially stringent mechanical dimension requirements that would be present with optical interfaces on multiple edges of the companion die. An optical facet of an edge of a cavity in the host wafer can be aligned to an optical facet of an edge of the companion die without requiring precise dimensioning of the companion die surface or of the cavity dimensions. A cavity in the host wafer is not necessarily needed in all implementations since a surface of the companion die can include optical interface aligned to an optical interface on a portion of the surface of the host wafer.

Active optical alignment, in which light is coupled into the companion die from the host wafer during alignment, is facilitated due to the independent optical alignment. In some implementations, on-chip reflectors can be used to allow high-precision active optical alignment of the companion die on the host wafer without having to electrically power the companion die. The pick-up tools and alignment process can be simplified with on-chip reflectors (e.g., without requiring management of heat sinking during the alignment process, or electrically probing small metal pads). In some implementations, passive optical alignment (e.g., using fiducial marks) can be used instead of, or in addition to, active optical alignment.

Electrical connection can be performed, after optical connection, using curved (e.g., S-shaped) wire bonds. Such wire bonds are mechanically robust because they buffer mechanical tensions (e.g., tension that may be caused due to thermal expansion of different materials). Moreover, they are low profile and do not contribute to excessive topography on the surface of the integrated device.

For implementations that use a cavity in the host wafer, there are no strict constraints on the cavity depth. For example, a cured adhesive (e.g., UV-cured epoxy, or other type of glue) can be used between the bottom of the cavity and the bottom of the companion die to buffer potential non-uniformities in cavity depth and/or die thickness. The top surface of the companion die and the top surface of the wafer can be relatively flush to facilitate further processing steps (e.g., CMOS compatible steps).

The host wafer can be encapsulated with an extra-dielectric layer and non-CMOS compatible materials can be isolated so that some processes, such as an additional metal interconnection layer, can still be realized at the far-BEOL level with mitigated contamination risks.

The cavity flatness management is feasible using multi-step silicon etching. Depending on the non-uniformity profile of the bottom of the cavity, a dedicated pattern and density can be applied to control the final adhesive distribution.

Some potential drawbacks of certain integration techniques (e.g., controlled collapse chip connection, also called "flip-chip" connection) can be avoided. For example, no complex metallization is required inside the cavity. Since processing can be performed at wafer level even after integration, the processing is simpler and more cost-effective. The integrated device has relatively smooth topography and can potentially accommodate subsequent mounting of another die (e.g., an electrical die). The metal pads of the companion die are directly accessible on the top surface, which can be especially advantageous for some devices, such as modulators, which are addressed by RF signals.

The resulting integrated device is compact for subsequent system assembly and packaging.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 3A-3D are schematic diagrams of host wafer fabrication steps.

DETAILED DESCRIPTION

Figure 1A:
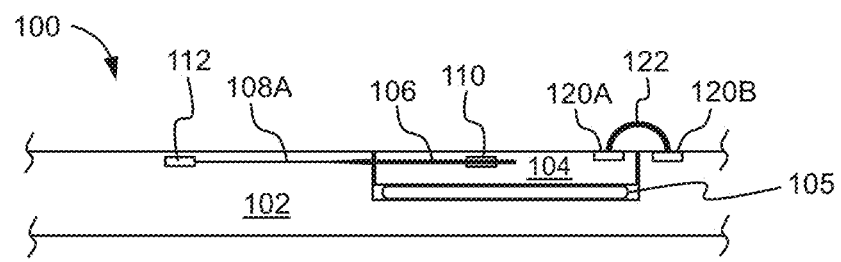
FIGS. 1A and 1B are schematic diagrams of side and top views, respectively, of a portion of a host integrated circuit wafer and a companion die.

A variety of example implementations of 3D opto-electrical chip integration strategies are described herein, whereby a companion chip (or, equivalently "companion die") can be directly bonded to a host chip (or, equivalently "host die") without requiring strict alignment constraints that would be used in some other techniques. For example, in some techniques (e.g., flip-chip techniques), in addition to the already precise alignment precision needed for forming optical connections, there is an additional alignment constraint needed to form electrical connections. Even though the alignment precision needed for forming electrical connections is not as precise as for forming optical connections, the need for simultaneous alignment detracts from the ability to achieve optimal optical alignment. Instead, using the techniques described herein, active sections of both dies can be optically aligned to each other, and independently electrically connected to each other after optical alignment, yielding an integrated device or system that enables concurrent electrical and optical communication between the dies during operation of the integrated device. This 3D co-integration of multi-platform opto-electrical dies in a single device provides for increased flexibility and/or complexity in a photonic integrated circuit implemented by the device, while maintaining low insertion loss between different portions of the device.

The following are examples of some of the challenges associated with certain integration techniques (e.g., wafer level direct bonding and post-processing, flip-chip and die-to-wafer bonding, and package level die-to-die bonding or system-to-system assembly), which can be mitigated or avoided completely in some of the implementations of the techniques described herein.

For wafer level direct bonding and post-processing of material:
  New materials and/or "forbidden" materials may need to be handled in a foundry. Consequently, isolated foundry areas using dedicated tools may need to be used for the fabrication processes, which may lead to increased cost and may limit versatility.
  Yield incompatibilities may arise. For example, after III-V material devices go through a "burn-in process" and are tested, successful devices are then integrated. Silicon technologies are associated with relatively high yields. Thin layers of bare III-V material may be bonded to silicon and processed as sections of bare III-V material, without burn-in. Wafer-level testing may then reject all failing dies, clamping the yield to that of the III-V material sections.
  Some processing steps may be limited due to incompatibility between silicon processing and temperature control challenges, and the new material processing needs.

For flip-chip and die-to-wafer bonding:
  Companion dies can be tested first, with operating dies being integrated into a host wafer, however, the metal process on the host wafer is typically complex.
  The positioning step is over-constrained and sub-optimal for the optical alignment because both optical and electrical connections are formed concurrently.

For package level die-to-die bonding or system-to-system assembly:
  The assembly can be performed at package level between sub-systems that have been tested and yielded individually, also called a known good die (KGD) technique, however, package level assembly may be expensive.
  Discrete systems built by packaging separate dies tend to be bulkier.
  Optical interconnection is not trivial and additional signal loss can occur.

The techniques described herein enable processing steps after the companion die is optically aligned and bonded to the companion wafer (e.g., using cured adhesive processing). This increases the ability to provide compatible materials and processing between the companion die and the host wafer, and compatibility with host die after the host wafer is diced. For example, various types of compatibility include:
  Chemical compatibility (e.g., associated with bonding between metals)
  Thermal compatibility (e.g., associated with coefficient of thermal expansion)
  Mechanical compatibility (e.g., associated with mechanical strengths)
  Electrical compatibility (e.g., associated with resistances)

Figure 1B:
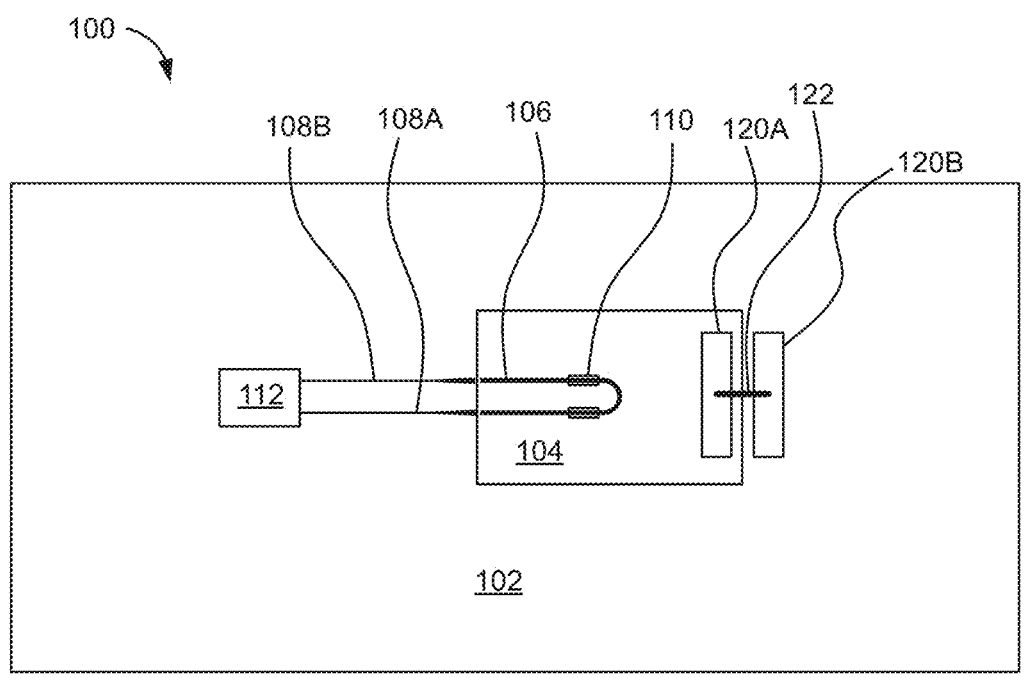

FIGS. 1A and 1B show side and top views, respectively, of an example a portion of an integrated circuit wafer 100 that includes a substrate 102 having a cavity in which a companion die 104 has been integrated. The substrate 102 includes at least one layer in which waveguides and other components of a portion of a photonic integrated circuit are formed. The companion die 104 also includes waveguides and components of another portion of the photonic integrated circuit. The companion die 104 has an edge surface that is aligned with a surface of the cavity, and the alignment is held in place while securing the companion die 104 using a bonding material 105 between the companion die 104 and the cavity (e.g., secured on at least a portion of the bottom surface, as show in in this example). The alignment process provides optical alignment for at least one edge on which there are one or more optical mode defining structures in proximity to respective optical mode defining structures on at least one surface of the cavity. In some implementations, there are two or more optical mode defining structures being aligned, which can significantly increase the alignment precision that is needed. In this example, the mode defining structures of the companion die 104 are ends of a waveguide 106, and the mode defining structures of the cavity are ends waveguides 108A and 108B. The waveguide 106 is curved to loop back an optical wave after propagating through one or more photonic structures 110. There is also a photonic structure 112 coupled to the waveguides 108A and 108B. After optical alignment between the photonic structures has been completed, a separate electrical connection process can be performed. For example, metal contacts 120A and 120B on the top surface of the companion die 104 and the substrate 102, respectively, can be connected using a metal wirebond 122.

Figure 2A:
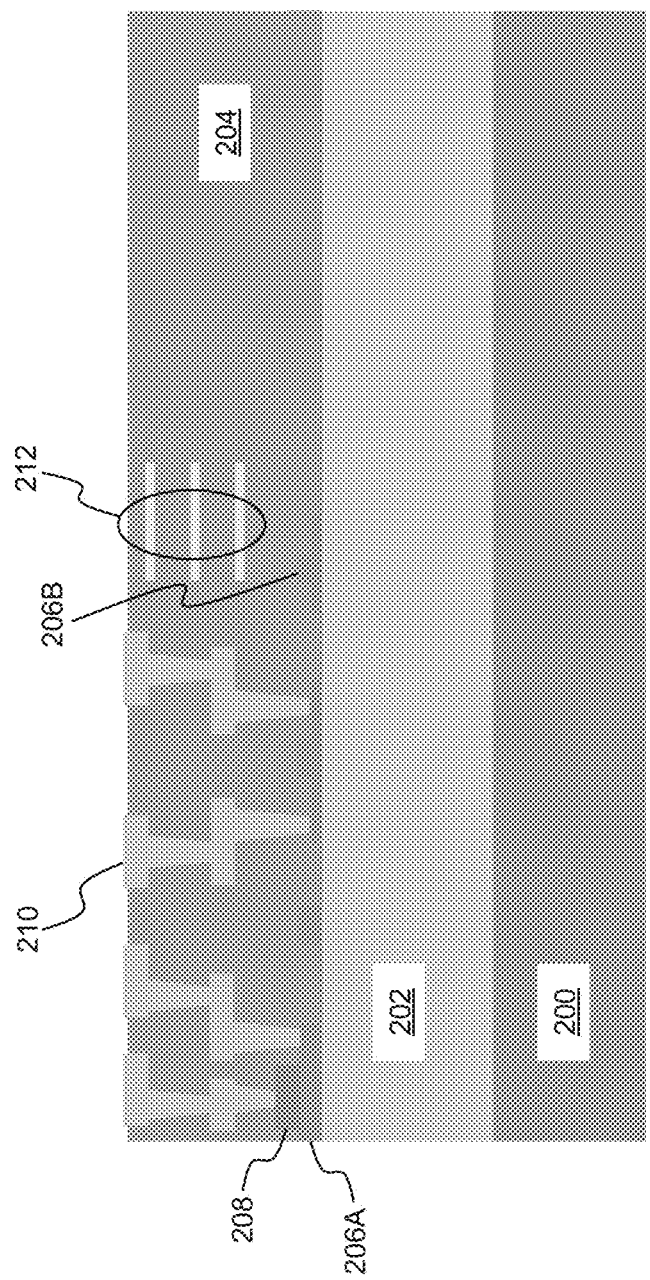
FIGS. 2A-2D are schematic diagrams of steps for integrating a host wafer and a companion die.

FIG. 2A shows an example of a portion of a host wafer that is being fabricated to provide a portion of a photonic integrated circuit (PIC). This example uses a silicon-on-insulator (SOI) wafer that provides a bulk substrate 200 composed essentially of silicon, a buried oxide (BOX) layer 202 composed essentially of silicon dioxide, and a top layer of silicon that is patterned to form silicon-based structures that are covered by a deposited silicon dioxide layer 204. For example, the silicon-based structures can include multiple materials such as a silicon patterned structure 206A and a grown or deposited germanium structure 208 forming an electro-optic component. The silicon-based structures can also include a waveguide 206B (e.g., a ridge waveguide) formed by patterning another portion of the top silicon layer. Some of the components in the PIC use electrical signals that are applied through metal structures 210 that include a metal contact on the top surface of the deposited silicon dioxide layer 204 that are in contact with other metal pillar and/or contact structures within the deposited silicon dioxide layer 204 down to active devices (e.g., using back-end of line (BEOL) metal processing). In this example, there is also an optical mode defining structure 212 that is able to couple an optical wave to or from an optical mode guided within one of the waveguides 206B. For example, the optical mode defining structure 212 can be a spot size converter structure that includes material that has a higher refractive index than the surrounding silicon dioxide and is structured using adiabatically tapered structures (shown as structure formed in three layers in this example) configured to use evanescent coupling to transfer optical wave from the waveguide 206B to a desired target optical mode. Examples of such spot size converters are described in more detail in U.S. Patent Application Publication No. 2017/0017034, incorporated herein by reference.

Figure 2B:
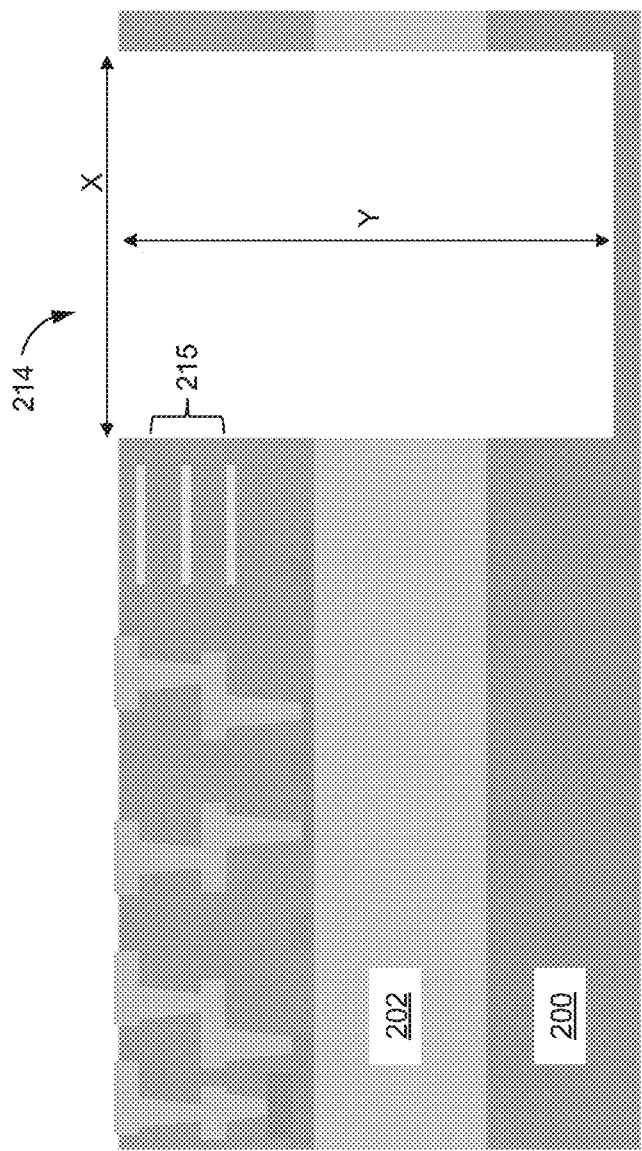

FIG. 2B shows an example of a cavity 214 that is formed within a portion of the host wafer that may have the top silicon layer stripped away but is otherwise left unprocessed. The cavity 214 is formed to have appropriate dimensions to receive a companion die that will be inserted and secured within the cavity 214. The optical mode defining structure 212 is in proximity to an edge surface of the cavity 214 to provide a defined optical mode size over a particular portion 215 of the edge surface, while the optical mode defining structure 212 itself does not necessarily extend all the way to the edge surface, as shown in this example illustrating a spot size converter. In other examples, the optical mode defining structure 212 can be the end of a waveguide that is patterned all the way to the surface of the cavity 214, in some cases with the waveguide core dimensions tapered to provide an optical mode of a given size. This figure and other figures show the cavity 214 not to scale to clarify the illustration of the fabrication procedures that are being described. For example, the width X of the cavity 214 may be on the order of several millimeters, and the depth Y of the cavity 214 may be on the order of several tens of microns (e.g., 50 μm to 150 μm). The thicknesses of the other layers, and other component dimensions are also not to scale for clarity of illustration.

Figure 2C:
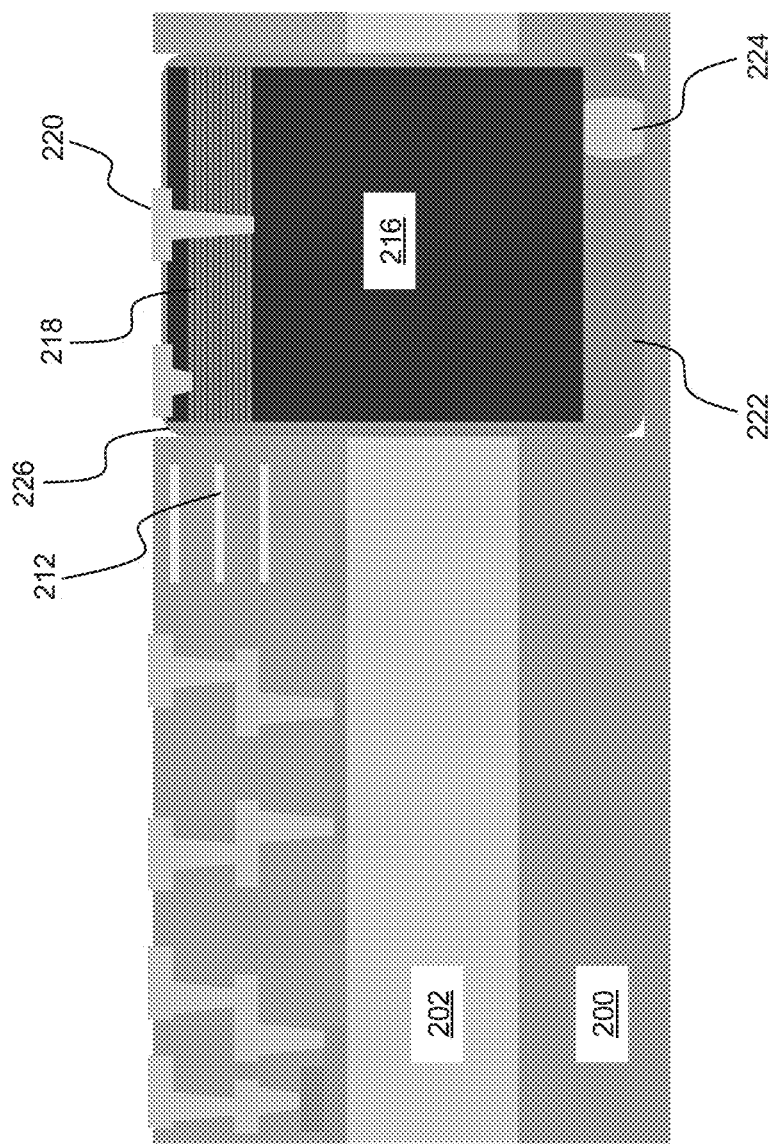

FIG. 2C shows an example of a companion die 216 that has been secured within the cavity 214. The companion die 216 may include a device such as a laser formed from a III-V material (e.g., a quantum well diode laser) where the device has an optical mode defining structure defining an optical mode that is identical to, or substantially overlapping with, the optical mode defined by the optical mode defining structure 212 of the host wafer. In this example, the optical mode defining structure of the companion die 216 is an active region of quantum well layers 218. The companion die 216 can be formed to be slightly smaller than the dimensions of the cavity 214 so that there is sufficient ability to move the companion die 216 for alignment of the defined optical modes. For example, back-grinding can be used to thin a wafer from which the companion die 216 is formed. The companion die 216 will also typically have metal contacts 220 for providing electrical signals to devices in the companion die 216. The bottom surface of the companion die 216 can be secured to the bottom surface of the cavity 214 during an alignment procedure in which the optical mode defining structure 212 of the host wafer is aligned to the optical mode defining structure 218 of the companion die 216. For example, a pick-up tool (PUT) can be used to hold and maneuver the companion die 216 using passive and/or active alignment techniques, described in more detail below. After the companion die 216 is in the appropriately aligned position, the companion die 216 can be secured into place using a cured adhesive 222 (e.g., starting in a viscous state that can conform to the space and then cured to a solid state using ultraviolet light), and/or using one or more metal bumps 224 (e.g., starting in a molten state that can conform to the available space and then cooled to a solid state). Example metal or metal alloys that could be used in the metal bumps 224 include gold (with additions such as indium), solder or solder coated copper bumps, or nickel plated copper bumps. Other conforming bonding materials can be used, such as a flowable oxide, which can also provide index matching by including impurities, or a substrate made with laminated organic layers or co-fired ceramic layers. A cured adhesive can be more cost effective in some cases, and a metal bump can provide enhanced heat dissipation and/or thermal resistance in some cases. The PUT can ensure that the companion die 216 does not move or bend during the curing and/or cooling process. After the position of the companion die 216 secured, any remaining space surrounding portions of the companion die 216 can be encapsulated using an index matching material 226 (e.g., glue, polymer, or engineered silicon oxide, depending on application).

Figure 2D:
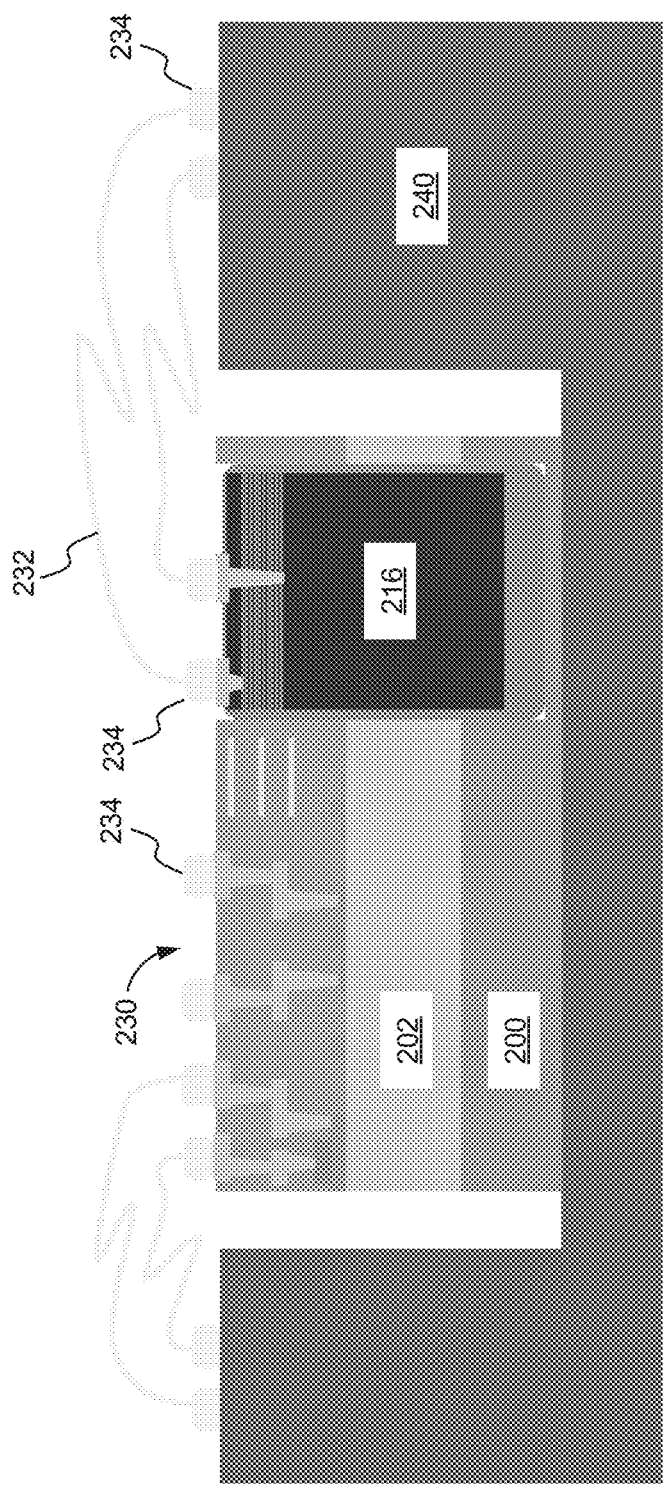

FIG. 2D shows an example of a printed circuit board (PCB) 240 that houses a host die 230 that is placed into a cavity within the PCB 240. Electrical connections can be made using curved (e.g., S-shaped) wire bonds 232 that are configured to enable movement of the wire bonds 232 to buffer any mechanical tensions. The wire bonds 232 are also configured to have a low profile, which facilitates a relatively low-profile topography on the top of the assembled device. Metal bumps 234 on the host die 230, the companion die 216, and/or the PCB 240 can be interconnected, as needed, using the wire bonds 232.

FIGS. 3A-3D show an example process flow for some of the fabrication steps used for the host wafer and the cavity 214 formed for receiving a companion die. In some cases, it is helpful to ensure that the fabrication steps are compatible with other fabrication processes, and that the fabrication steps are appropriate for handling relatively thin companion dies (e.g., 150 μm or less). FIG. 3A shows a state after initial fabrication steps that form structures within the deposited silicon dioxide layer 204. FIG. 3B shows a state after an initial etching step that etches down to the underlying bulk substrate 200 (e.g., a silicon substrate). FIG. 3C shows a state after fabrication steps to add metal bumps 234 on the top surface in far-Back End Of Line (far-BEOL) processing. FIG. 3D shows a state after a subsequent etching step that etches down into the bulk substrate 200, after which a companion die can be placed into the cavity 214 and aligned. In this example, there are multiple cavity etching steps because certain far-BEOL processes are not compatible with the presence of relatively deep cavities. Far-BEOL processes may involve steps such as metal electro-plating, and a cavity etched before the bumps could affect the growth of the bumps and could leave metal residues within the cavity. Etching the whole cavity (i.e., into the deposited silicon dioxide layer 204 and the BOX layer 202, which together form the oxide cladding, and the bulk substrate 200) after the far-BEOL may not be feasible because the proximity accuracy needed with respect to a spot-size converter used as an optical mode defining structure (e.g., ±5 μm vs. ±0.2 μm) could be difficult to achieve. The photolithography technique used in far-BEOL, and its associated mask overlay specifications, will usually guarantee a relative positioning precision of 5 μm. However, the mask overlay specifications within a traditional SiPhot foundry allows relative positioning precisions of less than 200 nm. Thus, defining the cavity position within the SiPhot process, even if the full depth etching is achieved subsequently, may result in better accuracy.

Figure 4A:
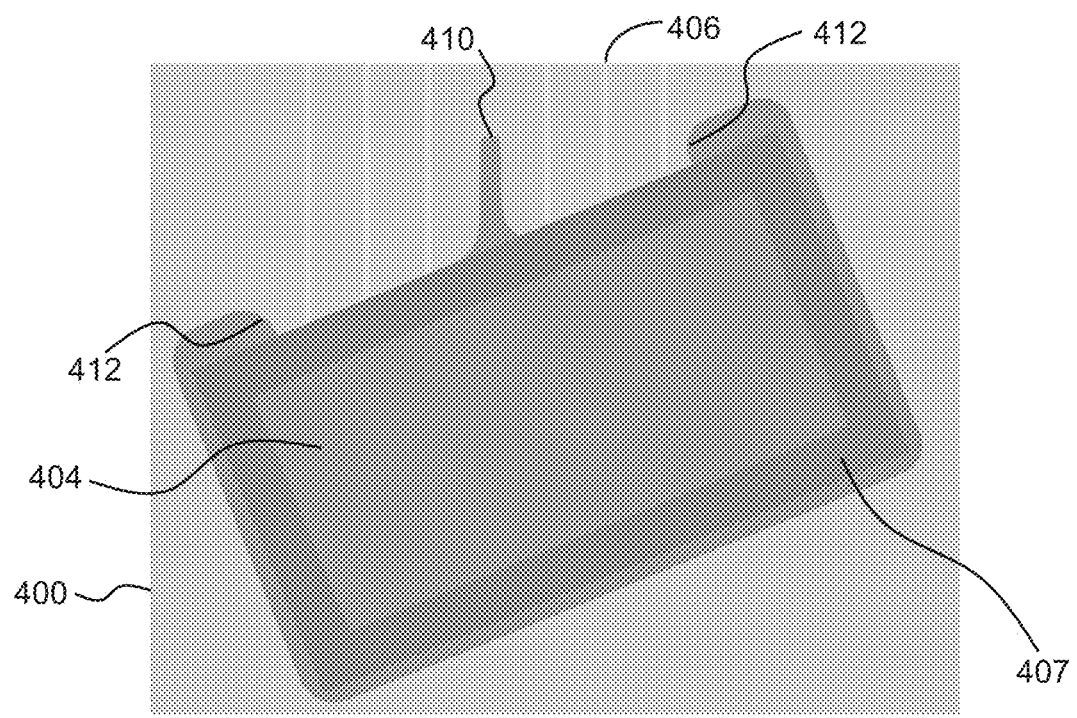
FIGS. 4A-4B are schematic diagrams of top and side views, respectively of a portion of a host wafer with a cavity.
Figure 4B:
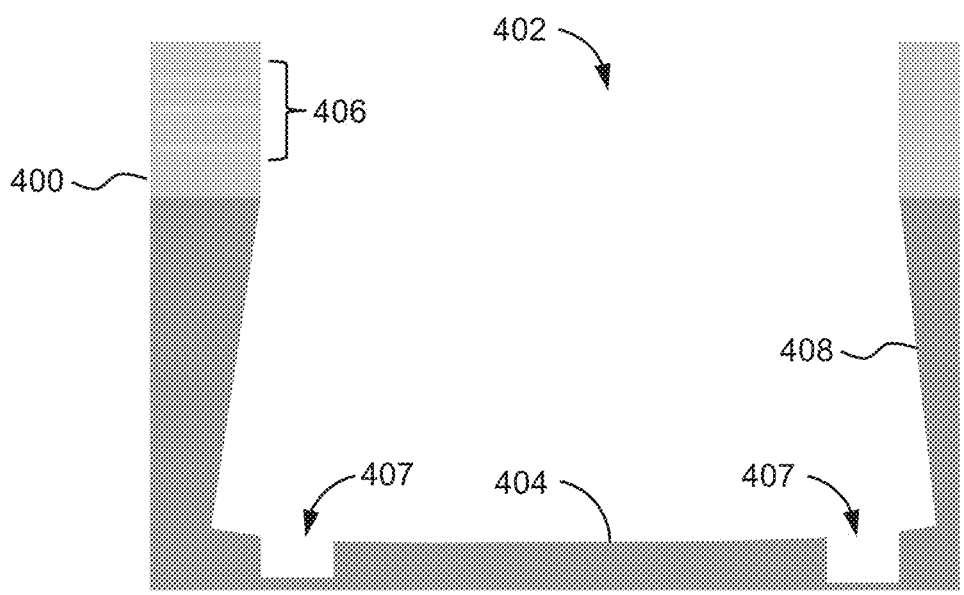

FIGS. 4A and 4B show top and side views, respectively, of a portion of a wafer 400 in which a cavity 402 is formed for receiving a companion die (not shown). Optical mode defining structures in the companion die will be aligned to optical mode defining structures 406 in the wafer 400. In this example, the cavity edge surface that has the ends of the optical mode defining structures 406 is at an angle with respect to the propagation axis of the optical mode, as shown in the top view. This tilt angle at the optical interface reduces the interfacial reflections between the silicon and the companion die. The slightly concave bottom surface 404 of the cavity 402 has a rectangular ring-shaped trench 407 etched at the bottom of the cavity 402 in proximity to the cavity walls 408. The trench 407 ensures that the epoxy is uniformly distributed under the companion die and prevents warpage during shrinkage of epoxy curing. The walls 408 have been etched to have a slight negative angle, as shown in the side view of FIG. 4B, and to have rounded corners, as shown in the top view of FIG. 4A. The negative angle of this portion of the cavity wall 408 ensures that any roughness imperfections near the bottom of the companion die do not prevent the companion die from getting close to the bottom of the cavity 402. The rounded corners ensure that metal and/or polymer residues will be easily stripped after the metal bump fabrication. There is also a dispensing rail 410 etched into one portion of the cavity 402, which ensures that the epoxy properly spreads along the interface between the companion die and cavity 402, reducing occurrence of air gaps. Inset curved portions 412 of the cavity 402 are formed at two of the corners to ensure that the portions of the companion die and the cavity wall 408 that are aligned for optical coupling can be substantially flush with each other without a significant gap forming due to unintended contact at the corners.

Figure 5A:
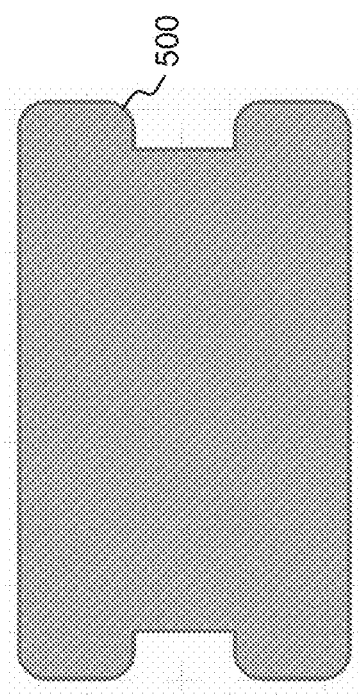
FIGS. 5A-5B are schematic diagrams of examples of a bottom surface of a cavity.
Figure 5B:
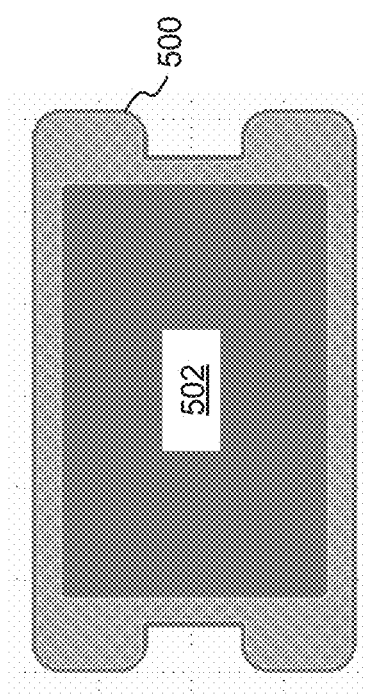

FIGS. 5A and 5B show examples of different alternative structures of a portion of the bottom surface of the cavity 500 without the rectangular ring trench (FIG. 5A), and with the rectangular ring trench (FIG. 5B). The trench may alternatively have other shapes other than a rectangular ring. The optimal shape of the trench may depend on the fluidic properties of the epoxy. Even if the companion die bonding is tolerant to sub-micron surface roughness, achieving an overall cavity planarity may be useful for avoiding any bending of the companion die. The trench can be formed in an etching step that occurs after the cavity is etched to the bottom surface 404.

Figure 6A:
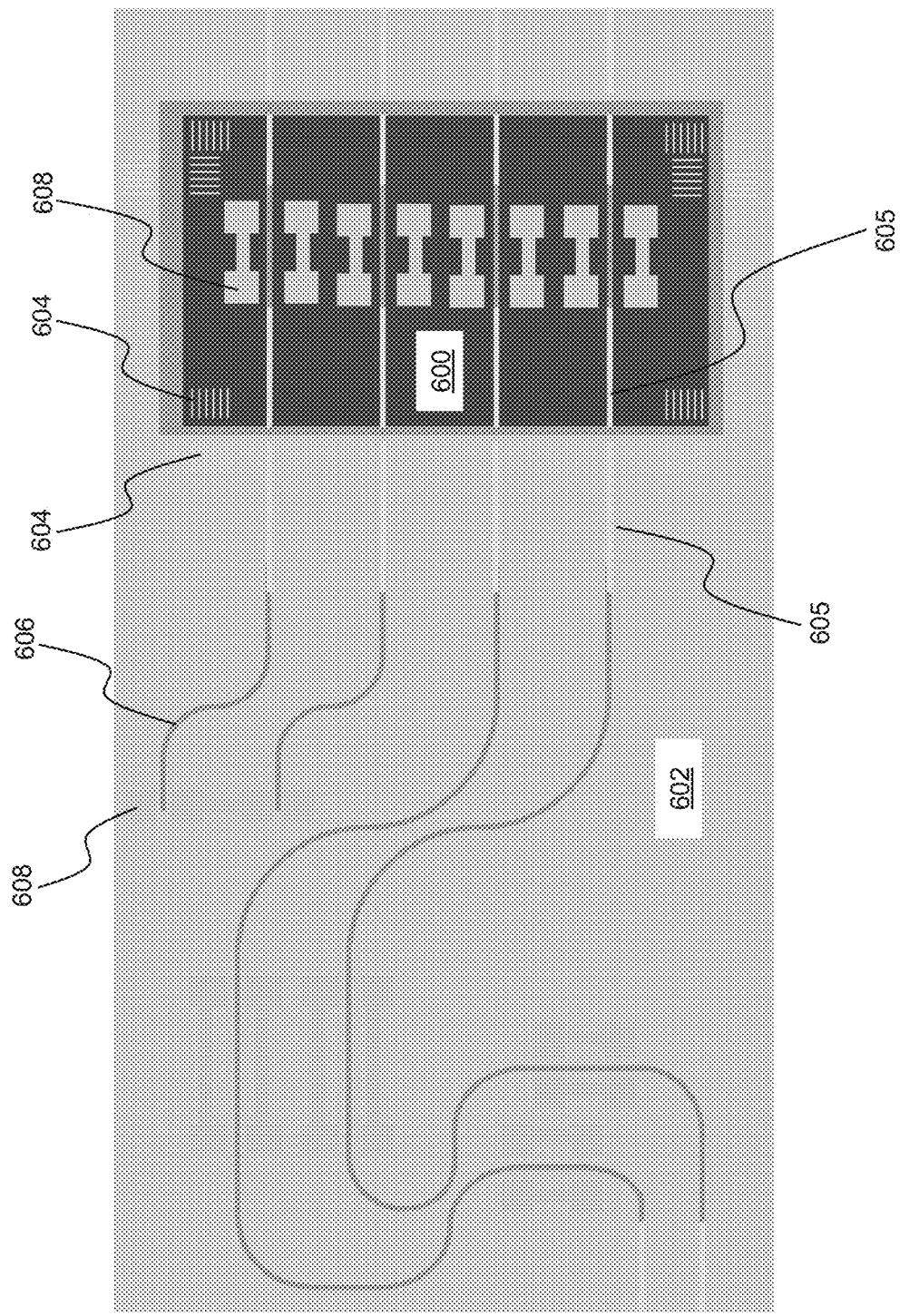
FIGS. 6A-6D are schematic diagrams of example alignment techniques for a companion die.

FIG. 6A shows an example of using alignment fiducials to aid in alignment of a companion die 600 to a host wafer 602. In this example, there are alignment fiducials 604 on the top surfaces of each of the companion die 600 and the host wafer 602 for aligning two edge surfaces on opposite ends of the companion die 600 such that optical mode defining structures 605 are aligned to each other if the alignment fiducials 604 in each of the four corners are aligned to each other. For example, a visual automatically machine-aligned or semi-automatically machine-aided alignment can be performed using a camera or other imaging device during alignment. After optical alignment for coupling optical signals to and from waveguides 606 in the portion of the host wafer 602 that will be diced into a host die, there can be subsequent processing to form electrical connections between electrical contacts 608.

Figure 6B:
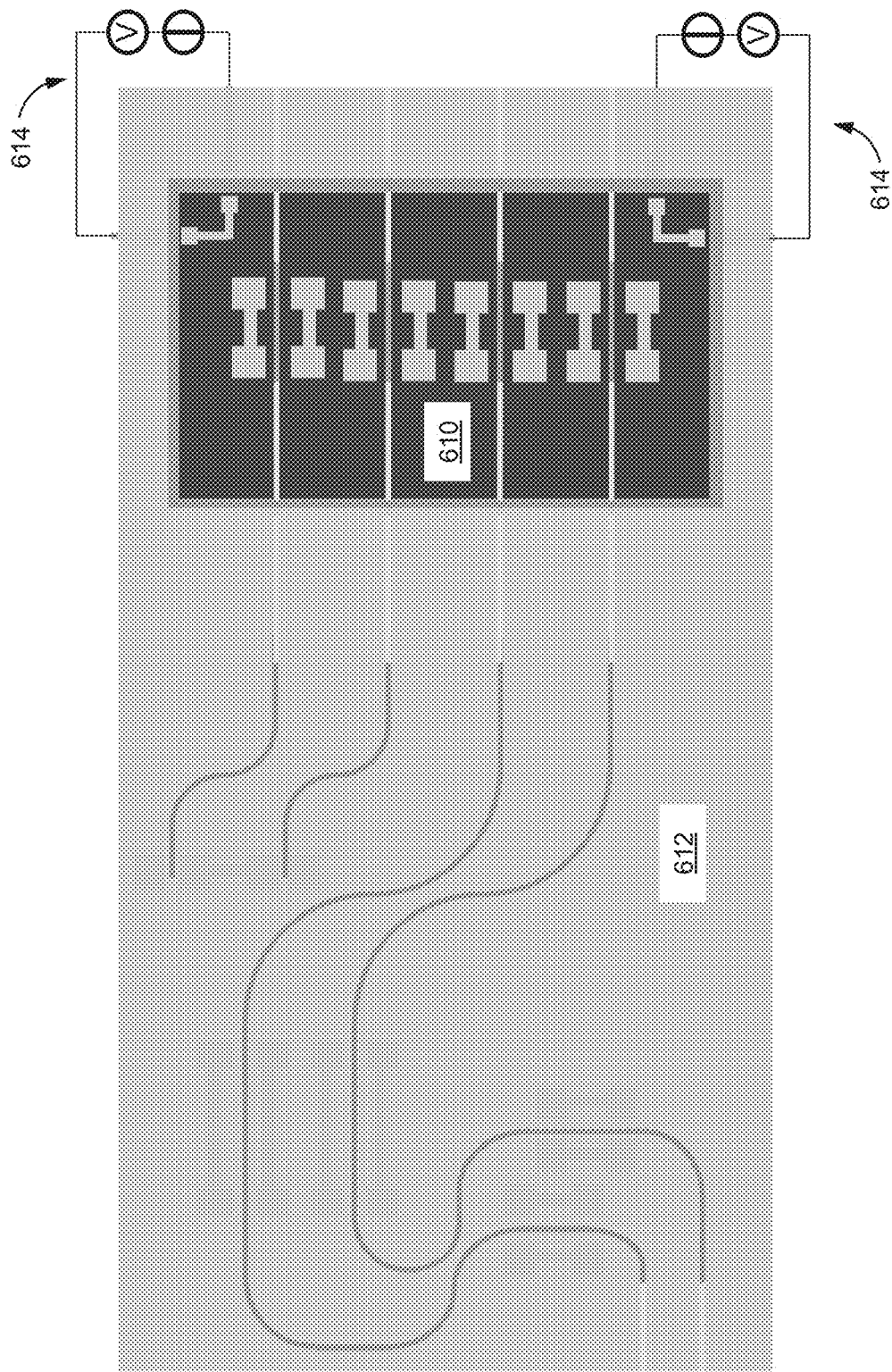

FIG. 6B shows an example of using alignment capacitors to aid in alignment of a companion die 610 to a host wafer 612. While alignment fiducials are useful for achieving precise (e.g., sub-micron) alignment in the plane of the top surface of the companion die 610 and host wafer 612 (the XY plane), alignment fiducials do not necessarily enable precision alignment along the axis perpendicular to that plane (the Z axis). In this example, precision Z-axis alignment can be achieved using one or more capacitive detectors 614 arranged at locations on the top surface in proximity to the edge surfaces, as shown. The capacitive detectors 614 can be used to position the companion die 610 with respect to the host wafer 612 based on feedback from electrical signals, where alignment is achieved when a capacitance measurement represented by the electrical signals is maximized.

Figure 6C:
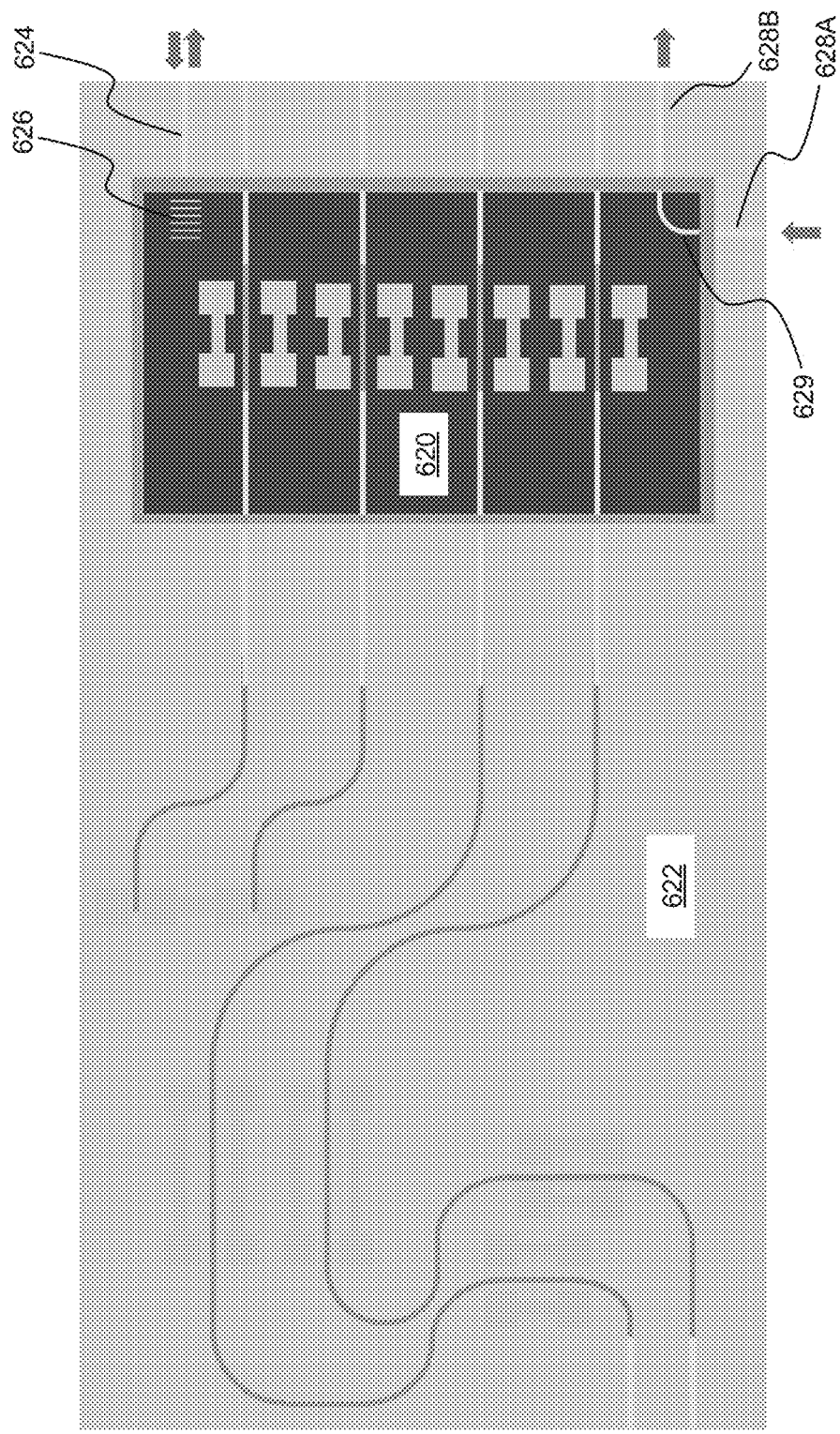

FIG. 6C shows an example of using alignment waveguides to enable active alignment of a companion die 620 to a host wafer 622. The use of capacitive detectors and/or alignment fiducials provide precise alignment may not provide enough speed or enough robust and consistent repeatability for some implementations. So, in some implementations, alignment waveguides can be used. One type of alignment waveguide 624 shown in this example provides light from the host wafer 622 to the companion die 620, which is reflected from a Bragg reflector 626 in the companion die 620, and received from the host wafer 622. The received optical signal is used to optically position the companion die 620 with respect to the host wafer 622 by determining when a maximum optical power has been reflected from the Bragg reflector 626. Other examples can use other types of reflectors. Another type of alignment waveguides 626A and 628B are used to couple light in and out, respectively of a curved waveguide 629 within the companion die 620, as shown. In this case, alignment is achieved when there is a maximum optical power coupled from the waveguide 626A to the waveguide 626B.

Figure 6D:
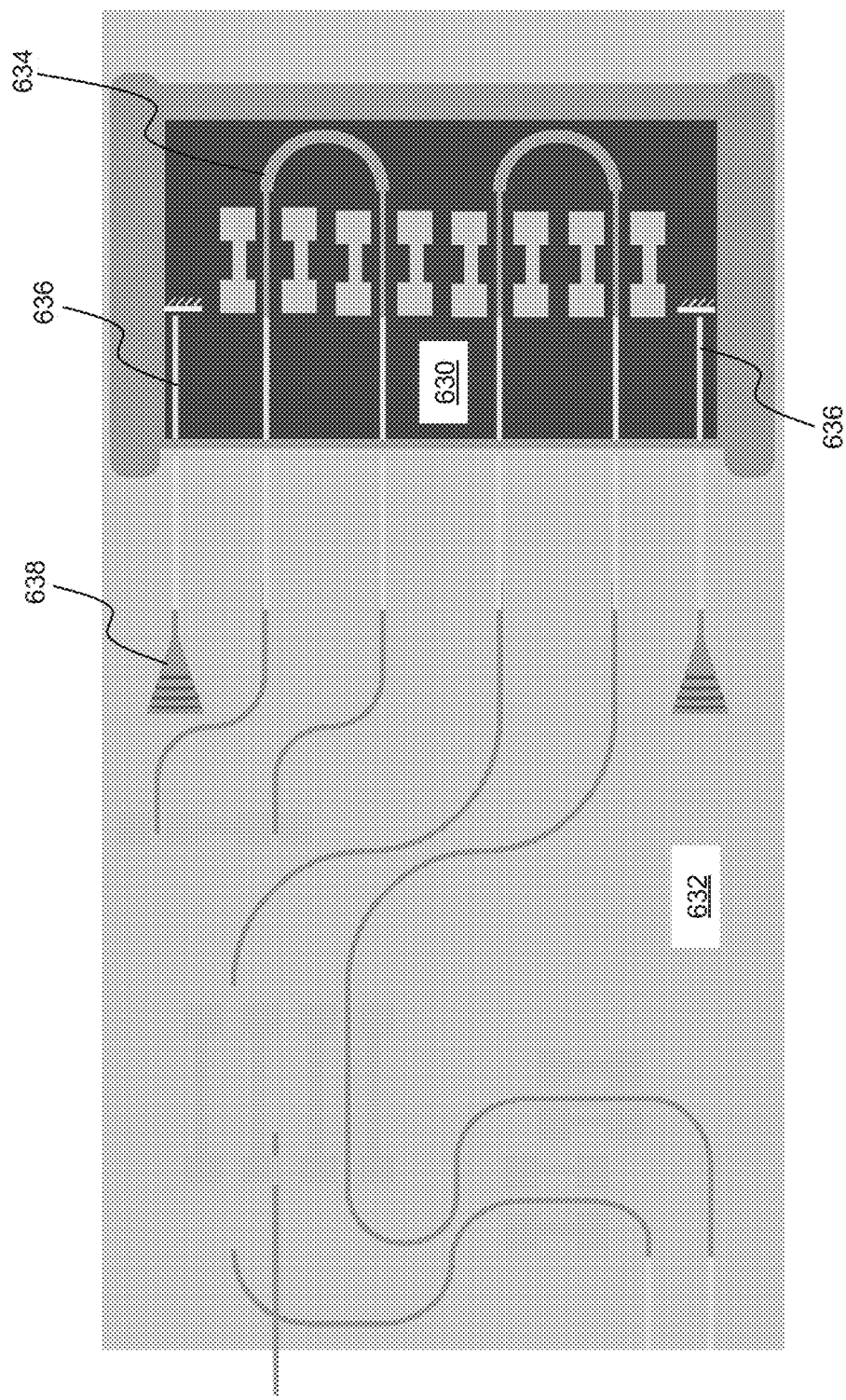

FIG. 6D shows an example of using waveguides within a companion die 630 that have a curved shape to enable optical coupling on a single edge surface, which reduces the constraints for alignment of the companion die 630 to a host wafer 632. In this example, a curved waveguide 634 has both ends coupled to the same edge surface of the companion die 630 for alignment with respective optical mode defining structures in the host wafer 632. The waveguide 634 is a functional part of the photonic integrated circuit that is formed by integrating the companion die 630 into the host wafer 632. The same edge surface of the companion die 630 can also include alignment waveguides 636 on both ends of the edge surface that are used to couple light into and out of the companion die 630 (e.g., reflected from an internal reflector) for active alignment. The reflectors can be implemented as any of a variety of types of reflectors, such as bare etched surface (silicon to air interface), metal on an etched surface, a Sagnac loop, or a Bragg reflector, for example. For example, the alignment optical wave can be coupled in and out of the host wafer 632 during alignment through a grating coupler 638.

Figure 7A:
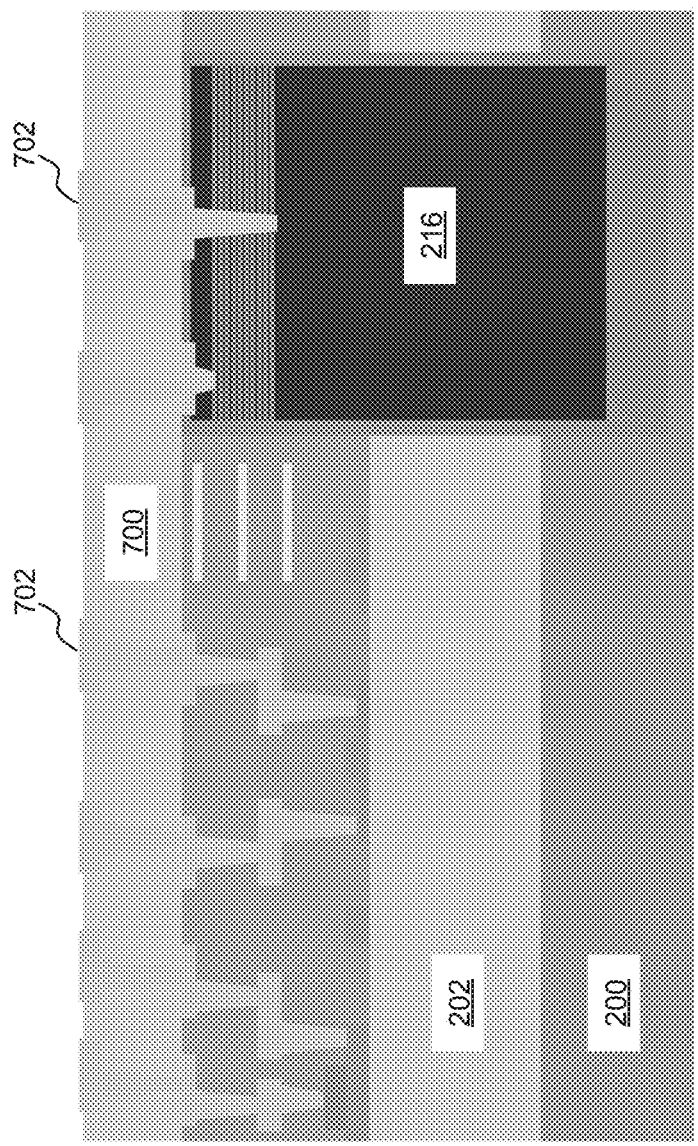
FIGS. 7A-7D are schematic diagrams of example alternative arrangements for integrating a companion die into a host wafer or die.

FIG. 7A shows an example of additional processing that can be performed after the companion die 216 has been secured within the host wafer. In this example, there is an additional metallization processing step to make the top surface more uniform and still provide contacts 702 that can be interconnected. Any number of additional layers can be added on top. With the companion die 216 completely encapsulated within the host wafer, there may be greater compatibility with certain standard silicon photonic CMOS processing steps of some foundries.

Figure 7B:
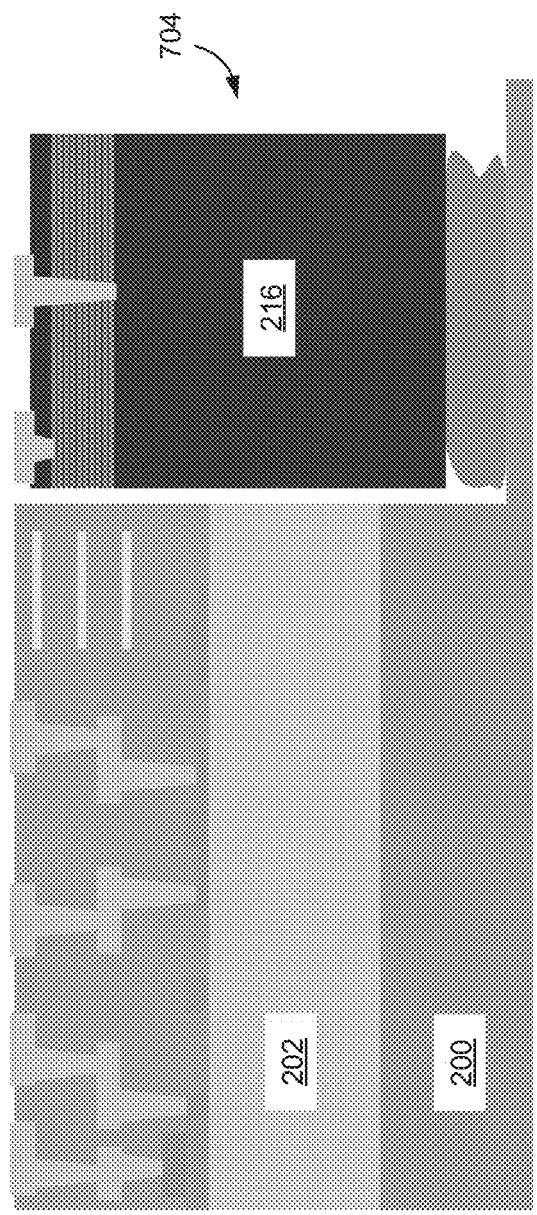

FIG. 7B shows an example of an alternative configuration of the companion die 216 being secured on the bottom to align one side to the host wafer while another side 704 of the companion die 216 is exposed, potentially providing access for other purposes. So, the cavity in this example is formed as an etched step at the edge of the host wafer or die rather than an enclosed cavity.

Figure 7C:
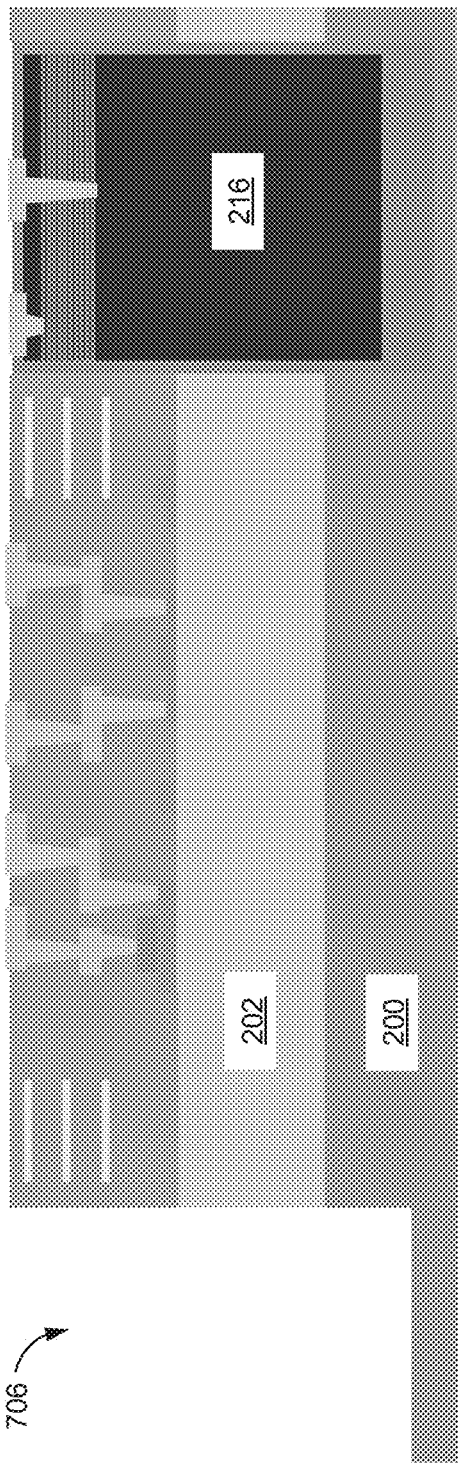
Figure 7D:
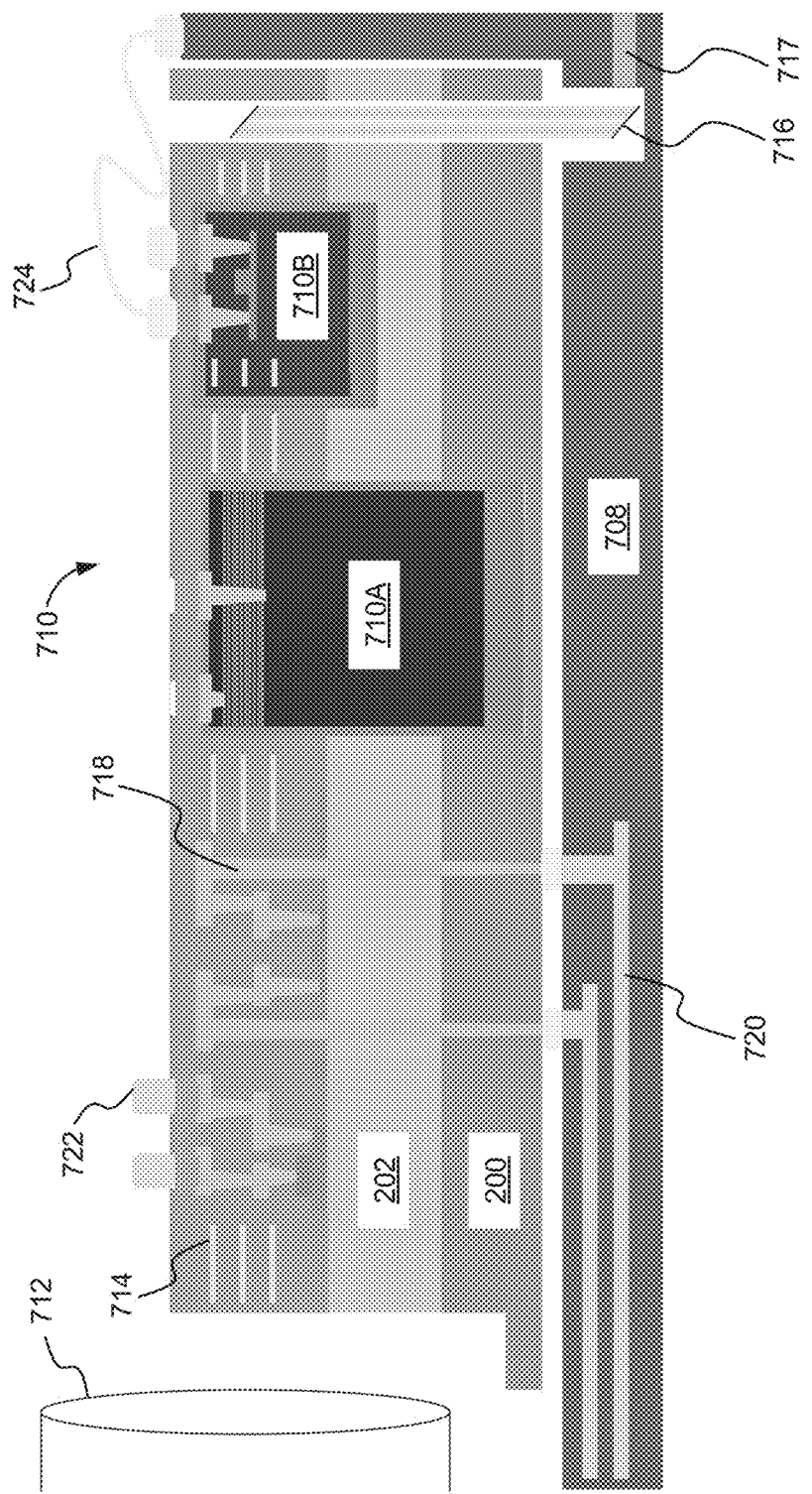

FIG. 7C shows an example of a host wafer that includes an additional edged trench 706 for other purposes, such as for fiber coupling. FIG. 7D shows an example of such a fiber coupled device where a PCB 708 (e.g., an optical PCB) houses a host die 710 in which two companion dies 710A and 710B have been integrated using the techniques described herein. An optical fiber 712 is coupled via a spot size converter 714. In this example, there is also an optical fiber periscope 716 for coupling to an embedded optical waveguide 717 within the PCB 708, a through silicon via (TSV) 718 for electrically coupling to an embedded metal conducting path 720 within the PCB 708, metal pillars 722 (e.g., copper pillars) for die bonding, and wirebonds 724 connecting metal contacts on the top surface.

Figure 8:
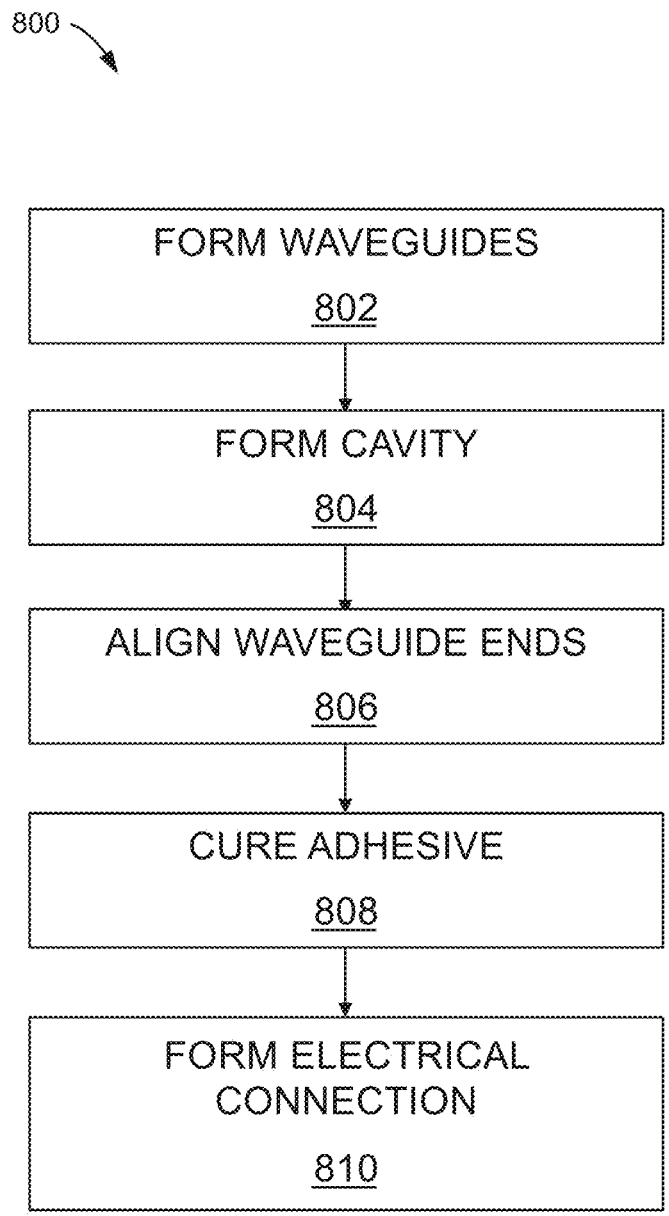
FIG. 8 is a flowchart of an example fabrication procedure.

FIG. 8 shows a flowchart for an example procedure 800 for fabricating an integrated device. The procedure 800 includes forming (802) two or more waveguides in at least one layer of an integrated circuit wafer, and forming (804) a cavity in the integrated circuit wafer. After the cavity has been formed, the procedure 800 includes steps for securing a die comprising a photonic integrated circuit within the cavity. In this example, the securing comprising: aligning (806) two or more optical mode defining structures on at least one edge of the die to respective optical mode defining structures on at least one surface of the cavity, and curing (808) an adhesive to form a bond between a bottom surface of the die and a bottom surface of the cavity. Other examples, can form the bond using other techniques, as described herein. The procedure 800 also includes, after the die has been secured, forming (810) an electrical connection between at least one metal contact on a top surface of the die to a portion of the integrated circuit wafer.

The example implementations described herein, and a variety of alternative implementations, can provide numerous advantages, including the advantages discussed above and below. Also described below are additional alternatives for some of the aspects described above.

For implementations that provide electrical connectivity using contacts on the top surface of the companion die, there are no precise constraints on the depth of the cavity in the host wafer. In some cases, the epoxy at the bottom can compensate for depth variability.

For some CMOS foundries, there may be cross-contamination constraints associated with wafer processing. In some implementations, these constraints can be satisfied by ensuring certain materials are integrated after certain wafer processing steps.

In some implementations, certain wafer-level processing and/or wafer-level testing is facilitated by avoiding substantial changes to the topography of the wafer surface. This can be achieved, for example, in implementations where the top surfaces of the companion chip and the host wafer are substantially aligned (i.e., substantially in the same plane). For example, one possible form of processing that can occur is subsequent bumping and flip-chip processing to integrated additional chips on top of a partially integrated wafer. Thus, a device can be formed with a first companion chip integrated using the techniques described herein, and a second companion chip integrated using flip-chip processing after the first companion chip has been integrated.

Electrical connections can be implemented using any of a variety of techniques including wire-bonding, use of an interposer, additional BEOL metal layer(s), use of a redistribution layer (RDL), for example. For electrical wire-bonding, connections can use low loop wirebonds between companion die and the host die. Electrical interconnection can be performed using S-shaped wirebonds, for example, and can be configured to attach using C4 balls.

Examples of different types of platforms that can be included in the host wafer include silicon photonics platforms, micro-electromechanical system (MEMS) platforms such as optical MEMS or electro-optical MEMS platforms, or Si Bipolar/CMOS analog and/or digital electronics platforms.

Examples of different types of devices that can be included in a companion die include III-V material based devices such as a laser, semiconductor optical amplifier (SOA), or modulator, MEMS devices, polymer based devices, devices including electro-optical, ferroelectric, or piezoelectric materials.

Some of the materials that can be included the host die and/or the companion die include GaN, InP, lithium niobate, barium titanate, glass, Si3N4, quartz, or sapphire.

Other platforms can be included where both optical and electrical connections are used. Various types of devices can be included in these platforms such as modulators, isolators. Characteristics associated with optical features of some platforms or devices include: emission for optical source and amplification, transparency for guiding, absorption for detection and attenuation, phase or intensity dependent mechanisms for modulation and delay compensation. Dedicated materials can be used for each device and integrated using the techniques described herein. The devices can then be assembled at the package level.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An article of manufacture comprising:
   at least a portion of an integrated circuit wafer that includes at least one layer in which two or more waveguides are formed;
   a cavity formed in the integrated circuit wafer;
   at least one die comprising a photonic integrated circuit, the die having
     at least one edge on which there are two or more optical mode defining structures in proximity to respective optical mode defining structures on at least one surface of the cavity,
     a bottom surface secured to a bottom surface of the cavity, and
     a top surface on which there is at least one metal contact;
   wherein the die is in optical alignment with the portion of the integrated circuit wafer such that a propagation axis of an optical mode defined by at least one optical mode defining structure on the edge of the die is substantially parallel to a propagation axis of an optical mode defined by at least one optical mode defining structure on the surface of the cavity; and
   wherein the cavity is shaped to provide closer proximity to the surface of the cavity for a middle portion of the edge of the die than for either of two end portions of the edge of the die.

2. The article of manufacture of claim 1, wherein a plurality of the two or more optical mode defining structures are aligned to the respective optical mode defining structures on at least one surface of the cavity.

3. The article of manufacture of claim 2, wherein the respective optical mode defining structures on at least one surface of the cavity comprise ends of respective waveguide couplers that are coupled to waveguides in the layer of the integrated circuit.

4. The article of manufacture of claim 1, wherein the bottom surface of the die is secured to the bottom surface of the cavity by at least one of: a cured adhesive, a metal or metal alloy, or a flowable oxide.

5. The article of manufacture of claim 1, wherein the top surface of the die is substantially aligned with a top surface of the integrated circuit wafer.

6. The article of manufacture of claim 1, wherein the two or more optical mode defining structures are ends of a single curved waveguide in the die.

7. The article of manufacture of claim 1, wherein the metal contact on the top surface of the die is electrically connected to a portion of the integrated circuit wafer.

8. The article of manufacture of claim 1, wherein the integrated circuit wafer comprises at least one layer of silicon.

9. The article of manufacture of claim 1, wherein the cavity is shaped to include inset portions in at least two corners to provide closer proximity to the surface of the cavity for a middle portion of the edge of the die than for either of two end portions of the edge of the die.

10. The article of manufacture of claim 1, wherein the bottom surface of the cavity includes at least one trench.

11. The article of manufacture of claim 1, wherein the die includes at least one reflector coupled to at least one of the optical mode defining structures on the edge of the die.

12. A method comprising:
    forming two or more waveguides in at least one layer of an integrated circuit wafer;
    forming a cavity in the integrated circuit wafer;
    securing a die comprising a photonic integrated circuit within the cavity, the securing comprising
        aligning two or more optical mode defining structures on at least one edge of the die to respective optical mode defining structures on at least one surface of the cavity, and
        forming a bond between a bottom surface of the die and a bottom surface of the cavity; and
    forming an electrical connection between at least one metal contact on a top surface of the die to a portion of the integrated circuit wafer;
    wherein the die is in optical alignment with the portion of the integrated circuit wafer such that a propagation axis of an optical mode defined by at least one optical mode defining structure on the edge of the die is substantially parallel to a propagation axis of an optical mode defined by at least one optical mode defining structure on the surface of the cavity; and
    wherein the cavity is shaped to provide closer proximity to the surface of the cavity for a middle portion of the edge of the die than for either of two end portions of the edge of the die.

13. The method of claim 12, further comprising dicing the integrated circuit wafer to form a host die that includes the cavity and the die secured within the cavity.

14. The method of claim 12, wherein the respective optical mode defining structures on at least one surface of the cavity comprise ends of respective waveguide couplers that are coupled to waveguides in the layer of the integrated circuit.

15. The method of claim 12, wherein the bond secures the bottom surface of the die to the bottom surface of the cavity by at least one of: a cured adhesive, a metal or metal alloy, or a flowable oxide.

16. The method of claim 12, wherein the top surface of the die is substantially aligned with a top surface of the integrated circuit wafer.

17. The method of claim 12, wherein the two or more optical mode defining structures are ends of a single curved waveguide in the die.

18. The method of claim 12, wherein the cavity is shaped to include inset portions in at least two corners to provide closer proximity to the surface of the cavity for a middle portion of the edge of the die than for either of two end portions of the edge of the die.

19. The method of claim 12, further comprising forming at least one trench in the bottom surface of the cavity.

20. The method of claim 12, wherein the die includes at least one reflector coupled to at least one of the optical mode defining structures on the edge of the die.

* * * * *